(12) United States Patent
Hoefflin et al.

(10) Patent No.: US 9,605,755 B2
(45) Date of Patent: Mar. 28, 2017

(54) METHOD OF CONTROLLING A SYNCHRONIZER ACTUATOR FORK OF A TRANSMISSION

(71) Applicant: GM GLOBAL TECHNOLOGY OPERATIONS LLC, Detroit, MI (US)

(72) Inventors: Glenn W. Hoefflin, Fenton, MI (US); Minh Q. Truong, Commerce Township, MI (US); Christopher Jay Weingartz, Holly, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 265 days.

(21) Appl. No.: 14/549,584

(22) Filed: Nov. 21, 2014

(65) Prior Publication Data

US 2016/0146341 A1    May 26, 2016

(51) Int. Cl.
*F16H 61/30* (2006.01)
*F16H 63/30* (2006.01)
*F16H 61/28* (2006.01)

(52) U.S. Cl.
CPC .............. *F16H 61/30* (2013.01); *F16H 63/30* (2013.01); *F16H 63/3023* (2013.01); *F16H 2061/2823* (2013.01); *F16H 2063/3093* (2013.01)

(58) Field of Classification Search
CPC .. F16H 61/30; F16H 2061/2823; F16H 63/30; F16H 63/3023; F16H 2063/3093
See application file for complete search history.

(56) References Cited

U.S. PATENT DOCUMENTS

2011/0257855 A1* 10/2011 Weingartz ........... F16H 61/2807
701/58

* cited by examiner

*Primary Examiner* — Huan Le
(74) *Attorney, Agent, or Firm* — Quinn IP Law (57) ABSTRACT

A method and system for controlling movement of an actuator fork of a transmission through a pre-synchronization phase of a synchronization event at a pre-synchronization fork velocity includes adjusting the level of fluid pressure applied to an actuator operatively attached to the actuator fork to control the pre-synchronization fork velocity within a predetermined range of a velocity target. The method determines, via a controller, the fork velocity during the pre-synchronization phase of a current synchronization event, compares the determined fork velocity to a velocity target, and adjusts the pressure level of fluid applied to an actuator piston of the actuator to control the velocity of the actuator fork within a predetermined range defined by the velocity target during a subsequent pre-synchronization phase. The velocity target may be defined for a shift type, such as a fast or slow shift, where the shift type is determined by the controller.

20 Claims, 3 Drawing Sheets

Fig-6

METHOD OF CONTROLLING A SYNCHRONIZER ACTUATOR FORK OF A TRANSMISSION

TECHNICAL FIELD

The disclosure generally relates to a method of controlling a transmission, and more specifically to a method and system for adjusting a signal to an actuator piston to control movement of a synchronizer actuator fork of the transmission.

BACKGROUND

In vehicular transmissions, such as but not limited to a dual clutch transmission and an automatic manual transmission, synchronizers are used to engage the different gears to achieve the different gear ratios. The synchronizer includes a synchronizer hub fixedly mounted to a shaft of the transmission, a slidable sleeve meshingly engaged with the hub, and a blocker ring mounted on the shaft between the hub and the gear to be engaged. During a synchronization event, the sleeve is moved by an actuator fork that slides the sleeve axially relative to the shaft axis across the blocker ring and into interlocking engagement with a gear. The synchronization event includes a pre-synchronization phase followed by a synchronization phase. The timing, position and movement of the actuator forks must be precisely controlled to control the timing, position and movement of the sleeve attached thereto during the synchronization event to obtain consistent, smooth shifts.

The actuator forks may be controlled, for example, by a pressure solenoid that applies a fluid pressure to a first side of an actuator piston, and a flow solenoid disposed in series with the pressure solenoid and controlling fluid flow from a second side of the actuator piston. Movement of the actuator piston moves the actuator fork. The magnitude of the fluid pressure applied to the first side of the actuator piston determines how fast the actuator piston moves, and thereby how fast the actuator fork moves. An increase in the fluid pressure applied to the first side of the actuator piston increases the velocity at which the actuator fork moves, thereby decreasing the time elapsed during movement of the actuator fork from an initial disengaged position through the pre-synchronization phase and through the synchronization phase to a target engaged position. In contrast, a decrease in the fluid pressure applied to the first side of the actuator piston decreases the velocity at which the actuator fork moves, thereby decreasing the time elapsed during movement of the actuator fork from an initial disengaged position through the pre-synchronization phase and through the synchronization phase to an engaged target position.

SUMMARY

During a pre-synchronization phase of a synchronization event, the synchronizer sleeve moves axially relative to the synchronizer hub. A strut assembly disposed between the hub and the sleeve is selectively retained to the sleeve and is moved by the sleeve such that a strut of the strut assembly contacts and subsequently exerts a moving force on a blocker ring, to move the blocker ring into rotating frictional contact with the gear to be engaged with the shaft. This rotating frictional contact results in the blocker ring indexing prior to the sleeve contacting it thus preventing the sleeve from contacting the gear to be engaged prior to synchronization being completed. In one example, the strut assembly includes a ball plunger configured to be selectively retained in a detent defined by the sleeve, such that when the ball plunger is retained in the detent, the strut assembly is retained to the sleeve. The ball plunger is characterized by a breakaway force, such that when a sleeve force exerted on the ball plunger by the sleeve exceeds the breakaway force, the ball plunger is released from the detent, releasing the strut assembly from the sleeve.

The sleeve force exerted by the sleeve on the ball plunger and the amount of time required to complete the pre-synchronization phase of the synchronization event is influenced by the velocity of the actuator fork, which is determined by the applied pressure level of fluid applied to an actuator piston of a pressure solenoid controlling movement of the fork in the engagement direction. As the velocity of the actuator fork and the sleeve moved by the actuator fork increases, the sleeve force exerted by the sleeve on the ball plunger is increased such that the sleeve force is at least partially defined by the fork velocity. Accordingly, it is advantageous to control the velocity of the actuator fork and the attached sleeve below a breakaway velocity, such that the sleeve force exerted on the ball plunger does not exceed the breakaway force required to displace the ball plunger from the detent during the pre-synchronization phase. Further, it is advantageous to control the fork velocity during the pre-synchronization phase within a predetermined range of a velocity target, to provide consistent and predictable shift performance during the pre-synchronization phase of a synchronization event.

A method of controlling a transmission including a shaft, the shaft having a synchronizer and a gear mounted thereon, is provided. The method includes controlling the velocity of the actuator fork during the pre-synchronization phase at a velocity target or within a predetermined range of the velocity target. In one example, the velocity target is defined by the type of shift being executed by the transmission. The shift type may be, for example, one of a fast shift and a slow shift. The upper limit of the velocity target range may be defined by the breakaway velocity, such that the pre-synchronization velocity of the actuator fork is controlled below the breakaway velocity, where below the breakaway velocity the ball plunger of the strut assembly is retained in the detent of the sleeve such that the strut moves with the sleeve during the pre-synchronization phase and the sleeve via the retained strut exerts a moving force on the blocker ring to index the blocker ring during the pre-synchronization phase. The lower limit of the pre-synchronization fork velocity may be defined by calibration, for example, to minimize shift time and/or to attain a desired shift feel, etc.

The method of controlling a transmission including a shaft, the shaft having a synchronizer and a gear mounted thereon, includes moving, at a fork velocity, an actuator fork of the synchronizer in a gear engagement direction, through a pre-synchronization phase of a synchronization event. Movement of the actuator fork is controlled by an actuator including an actuator piston, where the actuator is operatively connected to the actuator fork and is actuable to move the actuator fork in the gear engagement direction by applying a fluid pressure to the actuator piston at an applied fluid pressure level. The applied fluid pressure is commanded by a controller in communication with the actuator, such that the fork velocity is defined by the applied fluid pressure level. The method includes determining, via the controller, the fork velocity, and comparing the fork velocity to a fork velocity target. The applied fluid pressure level is adjusted by the controller when the fork velocity and the velocity target are not equal.

In one example, the controller compares the fork velocity to a predetermined range defined by the velocity target, maintaining the applied fluid pressure level when the fork velocity is within the predetermined range and adjusting the applied fluid pressure level when the fork velocity is outside of the predetermined range. The amount by which the applied fluid pressure level is adjusted when the fork velocity is outside of the predetermined range may be predetermined, for example, by calibration. The predetermined amount by which the applied fluid pressure level is adjusted may be defined by the difference between the fork velocity and the velocity target. In one example, at least one look-up table may be stored in a memory in communication with the controller, such that the method includes selecting, via the controller, a look-up table, where the look-up table provides a predetermined amount to adjust the applied fluid pressure according to the difference between the fork velocity and the velocity target. The method further includes the controller determining, from the selected look-up table, the predetermined amount to adjust the applied fluid pressure.

In one example, the method includes the controller commanding a shift including the synchronization event, where the commanded shift is characterized by a shift type. The shift type may be one of a plurality of shift types executable by the transmission. In one example, the plurality of shift types includes at least one slow shift and at least one fast shift. The velocity target in this example is defined by the shift type. The method may include the controller selecting a look-up table from a plurality of look-up tables, each corresponding to a respective one of the plurality of shift types, and determining the predetermined amount to adjust the applied fluid pressure from the selected look-up table.

Moving the actuator fork through a pre-synchronization phase, in one example, includes moving the actuator fork at the fork velocity in the gear engagement direction, from a first fork position to a second fork position. The method may include sensing, via at least one fork position sensor in communication with the controller, the actuator fork at the first fork position at a first time and outputting a first signal to the controller at the first time, then sensing, via the at least one fork position sensor, the actuator fork at the second fork position and outputting a second signal to the controller at the second time. The fork velocity can be determined by the controller using the first and second fork positions and the first and second times. In one example, the controller is operable to time stamp the first signal with a first time stamp and to time stamp the second signal with a second time stamp, and to determine the fork velocity using the first and second fork positions and the first and second time stamps.

The above features and advantages and other features and advantages of the present disclosure are readily apparent from the following detailed description of the best modes for carrying out the disclosure when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. The figures are not necessarily to scale or proportion. Accordingly, the particular dimensions and applications provided in the drawings presented herein are not to be considered limiting.

Figure 1:
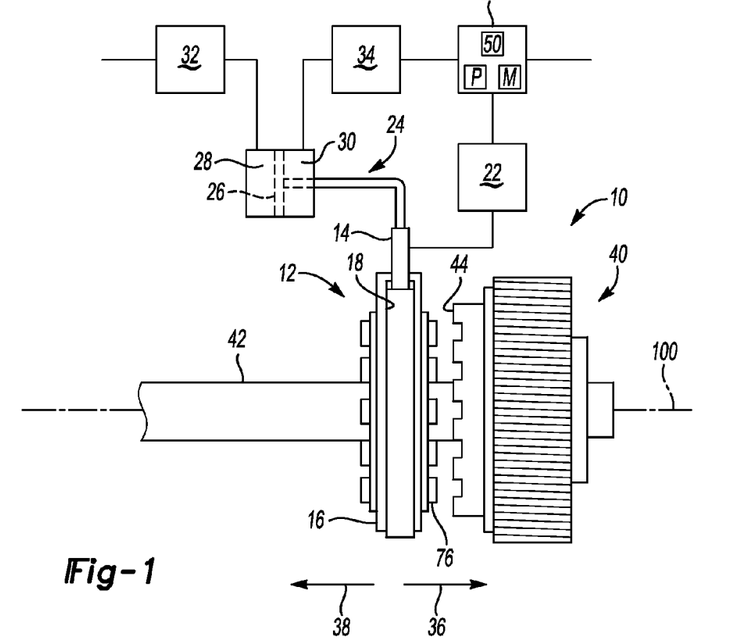
FIG. 1. is a fragmentary schematic plan view of a transmission including a synchronizer and an actuator fork in a disengaged position.

Referring to the figures, wherein like numerals indicate like parts throughout the several views, a transmission is generally shown at 10 in FIG. 1. The transmission 10 shown in fragmentary view in FIG. 1, by way of non-limiting example, may be one of an automated manual transmission and a dual clutch transmission. It should be appreciated that the disclosure may be utilized with other styles of transmission 10, not shown or described herein. The transmission 10 may include an input shaft (not shown) which may be operatively connected to an engine (not shown) to receive input torque from the engine. The transmission 10 ultimately delivers an output torque via an output shaft which may be used to drive, for example, some or all of the wheels (not shown) of a vehicle (not shown). The transmission 10 may further include a plurality of shafts including the shaft 42 shown in FIG. 1, and a plurality of gears including the gear 40 shown in FIG. 1. The plurality of gears is arranged such that each gear 40 is rotatably supported on one of the shafts 42 of the transmission 10 and in meshing engagement with at least one other gear 40 of the transmission 10. The shaft 42 is rotatable about an axis 100 of rotation, also referred to herein as the shaft axis 100.

The transmission 10 further includes at least one synchronizer 12 configured to rotatably couple at least one of the gears 40 to the shaft 42 upon which the gear 40 is rotatably supported, to engage that gear 40 of the transmission 10. In FIG. 1, the fragmentary view of the transmission 10 shows a shaft 42 defining a shaft axis 100, a gear 40 rotatably mounted on the shaft 42, and a synchronizer 12 mounted adjacent the gear 40, on the shaft 42. The synchronizer 12, which is shown in additional detail in FIG. 3, includes a synchronizer sleeve 16 which is meshingly engaged with a synchronizer hub 48, also referred to herein as a hub 48, such that the sleeve 16 is movable by an actuator fork 14, as indicated by the arrows shown in FIGS. 1, 3 and 5-6, in an engagement direction 36 toward the gear 40 to be engaged, and in a disengagement direction 38, for example, to a disengaged position, which may be a neutral position. The actuator fork 14 is operatively attached to the synchronizer sleeve 16 by any suitable means such that the actuator fork 14 can exert an axial moving force on the sleeve 16, which may be exerted, for example, by movement of an actuator piston 26 of a synchronizer actuator generally indicated at 24. In the example shown in FIGS. 1 and 3, the sleeve 16 defines a fork slot or groove 18 configured to receive the fork 14 such that the fork 14 is operatively attached to the sleeve 16. The synchronizer hub 48 is fixedly attached to the shaft 42 such that the synchronizer 12 rotates with the shaft 42.

Figure 3:
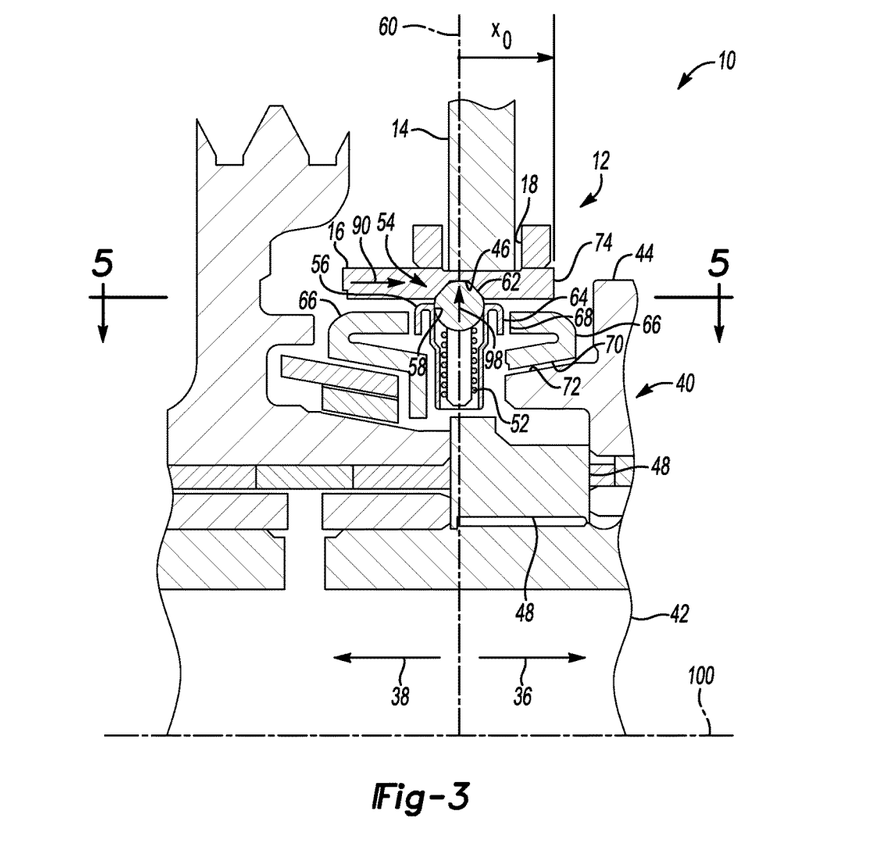
FIG. 3 is a fragmentary schematic cross-sectional view of a synchronizer showing the synchronizer and actuator fork in an initial disengaged position adjacent a gear.
Figure 5:
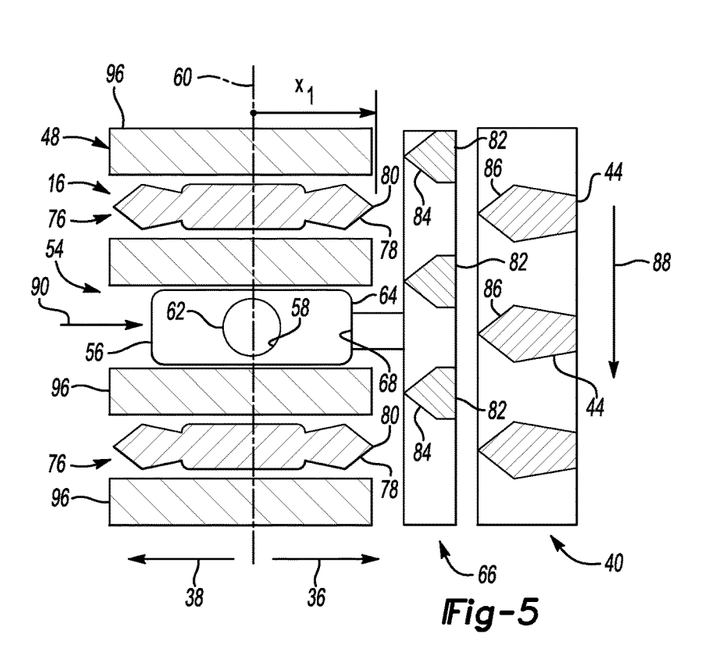
FIG. 5 is a schematic cross-sectional view of section 5-5 of FIG. 3 showing the synchronizer including a hub, a strut assembly, a synchronizer sleeve, and a blocker ring when the actuator fork is in a first fork position during a pre-synchronization phase of a synchronizing event.
Figure 6:
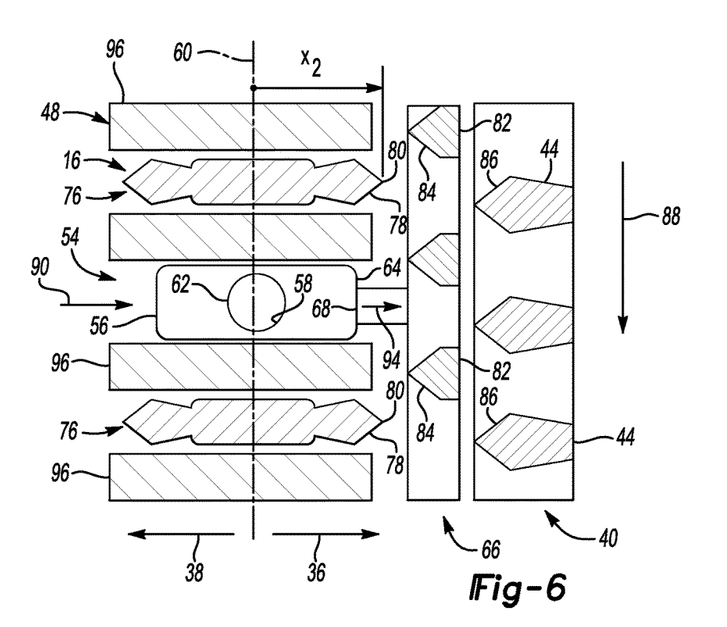
FIG. 6 is a schematic cross-sectional view of section 5-5 of FIG. 3 showing the synchronizer including the hub, a strut assembly, a synchronizer sleeve, and a blocker ring when the actuator fork is in a second fork position during the pre-synchronization phase of the synchronizing event.

The synchronizer sleeve 16 includes a first plurality of splines 76 defined by the inner diameter of the sleeve 16 and referred to herein as sleeve teeth 76. The synchronizer hub 48 includes a second plurality of splines 96 defined by the outer diameter of the hub 48 and referred to herein as hub splines 96. The sleeve teeth 76 and hub splines 96 are meshingly engaged with each other as schematically illustrated in FIGS. 3, 5, and 6 to meshingly engage the sleeve 16 to the hub 48. The sleeve 16 and sleeve teeth 76 are movable axially relative, respectively, to the hub 48 and hub splines 96 in the engagement direction 36 and in the disengagement direction 38. In the example shown in FIGS. 5-6, each of the sleeve teeth 76, the blocker teeth 82, and the gear dog teeth 44 are chamfered. The sleeve tooth chamfers 78 of each sleeve tooth 76 terminate in a spline tip 80. During the synchronization phase the sleeve 16 progresses through blocking travel at a synchronization velocity such that the sleeve tooth tip 80 and sleeve tooth chamfer 78 of each respective sleeve tooth 76 contacts a blocker tooth chamfer 84 of a respective blocker tooth 82, then continues through free flight travel such that contact between each sleeve tooth chamfer 78 and respective gear dog tooth chamfer 86 is initiated. The sleeve 76 progressed to a target engaged position, also referred to as a gear engaged position, where the plurality of sleeve teeth 76 engage with a plurality of gear dog teeth 44 of the gear 40 to couple the gear 40 to the hub 48. With the synchronizer 12 in the gear engaged position, the sleeve teeth 76 are meshingly engaged to the gear dog teeth 44 and to the hub splines 96 to couple the gear 40 to the hub 48 and thereby, to the shaft 42 upon which the hub 48 is mounted.

The synchronizer 12 further includes a blocker ring 66 having a plurality of blocker teeth 82 radially distributed such that the blocker teeth 82 may be indexed to the sleeve teeth 76 and to the gear dog teeth 44. The blocker ring 66 is positioned axially between the synchronizer hub 48 and the gear 40 to be engaged. The blocker ring 66 is movable axially in the engagement direction 36 by a strut 56 of a strut assembly 54 disposed between the hub 48 and the sleeve 16. The strut assembly 54 is axially moveable in the engagement direction 36 by the sleeve 16, as will be described in further detail herein, such that a strut face 64 of the strut 56 can contact a blocker ring interface 68 to exert a force on the blocker ring 66 to move the blocker ring 66 axially in the engagement direction 36. As shown in FIG. 3, the blocker ring 66 includes a blocker ring face 70 which when moved in contact with a gear face 72 of the gear 40 by the blocker ring 66 makes rotating frictional contact with the gear 40 such that over a transition time period from the pre-synchronization phase to the synchronization phase of a synchronization event the rotational speed of the blocker ring 66 and the rotational speed of the gear 40 are equalized to equalize the rotational speed of the gear 40 with the rotational speed of the synchronizer hub 48 and sleeve 16. With the blocker ring 66 moved in contact with the gear 40 by the strut 56, the blocker ring interface 68 is constrained between adjacent hub splines 96, as shown in FIG. 6, such that when the blocker ring face 70 and gear face 72 meet in rotating frictional contact the blocker ring 66 is indexed in the direction of rotation 88 indicated in the figures by arrow 88, until the blocker ring interface 68 interferes with an adjacent hub spline 96, at which time the rotational speed of each of the gear 40, blocker ring 66, hub 48, and sleeve 16 meshingly engaged to the hub 48 become equalized. In a non-limiting example shown in FIG. 3, the blocker ring face 70 and gear face 72 are each configured as a cone surface such that the blocker ring face 70 and gear face 72 engage along the tapered cone surfaces of the respective gear and blocker ring faces 72, 70.

The strut assembly 54, best shown in FIG. 3, includes a strut 56 defining a strut face 64 configured to contact the blocker ring interface 68 and a ball plunger 62 housed in the strut assembly 54. The ball plunger 62 and a compression spring 52 are arranged in a ball pocket 58 such that the ball plunger 62 is spring loaded by the compression spring 52 such that the ball plunger 62 exerts a plunger force 98 defined by the compression spring 52 against the sleeve 16 when in contact with the sleeve 16. The ball plunger 62 is configured to interface with a detent 46 defined by the sleeve 16, for example and as shown in FIG. 3, such that the ball plunger 62 may be selectively retained in the detent 46 to retain the strut assembly 54 to the sleeve 16, and such that the strut assembly 54 is axially moveable by movement of the sleeve 16 when the ball plunger 62 is retained in the strut 56. As shown in FIG. 3, when the sleeve 16 is moved axially with the ball plunger 62 retained in the detent 46, the sleeve 16 exerts a sleeve force 90 indicated by arrow 90 against the ball plunger 62.

The ball plunger 62 is characterized by a breakaway force, such that when a sleeve force 90 exerted on the ball plunger 62 by the sleeve 16 is less than the breakaway force, the sleeve force 90 is insufficient to overcome the plunger force 98 exerted by the ball plunger 62 on the detent 46 and the ball plunger 62 is retained in the detent 46. When the sleeve force 90 exerted on the ball plunger 62 by the sleeve 16 exceeds the breakaway force, the ball plunger 62 is released from the detent 46, releasing the strut assembly 54 from the sleeve 16. The magnitude of the sleeve force 90 exerted by the sleeve 16 on the ball plunger 62 is proportional to the velocity $V_F$ of the fork 14 as the fork 14 moves the sleeve 16 axially. As the velocity $V_F$ of the fork 14 and the attached sleeve 16 increases, the magnitude of the sleeve force 90 increases. At a breakaway velocity $V_{BA}$ of the fork 14, the sleeve force 90 is equivalent to the breakaway force. When the fork velocity $V_F$, and therefore the sleeve velocity of the attached sleeve 16, is below the breakaway fork velocity $V_{BA}$, the sleeve force 90 is insufficient to displace the ball plunger 62 from the detent 46 and the strut assembly 54 is retained via the ball plunger 62 and detent 46 to the sleeve 16 such that the strut 56 is moved by axial movement of the sleeve 16 by the fork 14. When the fork velocity $V_F$ is at or exceeds the breakaway velocity $V_{BA}$, the sleeve velocity is sufficient to displace the ball plunger 62 from the detent 46 such that the strut assembly 54 is released from the sleeve 16 and the released strut 56 is no longer moved with movement of the sleeve 16.

If the strut 56 is released from the sleeve 16 prior to completion of the pre-synchronization phase, the non-retained strut 56 does not engage the blocker ring 66, such that the blocker ring 66 does not synchronize the gear 40 to the hub 48 prior to movement of the sleeve 16 through the synchronization phase, and such that the rotational speed of the gear 40, sleeve 16 and hub 48 is not equalized prior to continued axial movement of the sleeve 16 toward the gear 40. In this event, e.g., where the blocker ring 66 has not synchronized the hub 48 to the gear 40 due to a premature release of the strut 56, e.g., a release of the strut 56 prior to synchronization, continued axial movement of the sleeve 16 in the engagement direction 36 may result in the sleeve teeth 76 clashing with the blocker teeth 82 and/or the gear dog teeth 44 during the synchronization event including gear 40 engagement, which may cause noise, shift roughness and/or inconsistency, and wear on the sleeve teeth 76 and the gear dog teeth 44. Accordingly, it is advantageous to control the velocity $V_F$ of the actuator fork 14 and the attached sleeve 16 during the pre-synchronization phase below the breakaway velocity $V_{BA}$, thereby controlling the sleeve force 90 below the breakaway force to retain the ball plunger 62 in the detent 46 during the pre-synchronization phase, and such that the strut 56 retained thereby can exert the axial force 94 (see FIG. 6) to engage the blocker ring 66 and the gear 40 to synchronize the gear 40 and hub 48 before axial travel of the sleeve 16 to engage the sleeve teeth 76 to the blocker teeth 82 and subsequently to the gear dog teeth 44. The velocity of the fork 14 during the pre-synchronization phase may be referred to herein as the pre-synchronization velocity $V_{PS}$ of the fork 14.

The actuator fork 14 is actuable to move the synchronizer sleeve 16, also referred to herein as the sleeve 16, in the engagement direction 36 to engage the synchronizer 12 to the gear 40, thereby coupling the gear 40 to the hub 48 and shaft 42. The actuator fork 14 is also actuable to move the sleeve 16 in the disengagement direction 38 to disengage the synchronizer 12 from the gear 40, thereby decoupling the gear 40 from the hub 48 and shaft 42. It should be appreciated that while only one actuator fork 14 is shown for clarity, the transmission 10 includes multiple actuator forks 14 to move multiple respective sleeves 16 of the various multiple synchronizers 12 into and out of engagement with their associated gears 40 during operation of the transmission 10.

The transmission 10 may include a control module 20, such as but not limited to a transmission controller 20, to control the operation of the transmission 10. The control module 20 may also be referred to herein as the controller 20. The control module 20 may include a computer and/or processor (P), and include all software, hardware, memory (M), algorithms, connections, sensors 22, etc., necessary to manage and control the operation of the transmission 10. "Module," "control module," "control," "controller," "control unit," "processor" and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), sequential logic circuit(s), input/output circuit(s) and devices, appropriate signal conditioning and buffer circuitry, and other components to provide the described functionality. "Software," "firmware," "programs," "instructions," "routines," "code," "algorithms" and similar terms mean any controller executable instruction sets including calibrations and look-up tables.

The controller 20 is configured to timestamp data received by the controller 20 and/or to associate a data element, such as a fork position X(t), with the time t at which the fork position X(t) was detected or measured. In the example method shown in FIG. 4, and referring to graph 50 shown in FIG. 2, the controller 20 is operable to timestamp a first position signal outputted by the fork position sensor 22 when the fork position sensor 22 senses the fork 14 at the fork position X1, such that the timestamp identifies the time t1 at which the fork 14 attained the fork position X1. The controller 20 is operable to store data to a memory (M), including, for example, a dataset X(t),t, for each synchronization event, where X(t) is the position of the fork 14 sensed by the sensor 22 at time t, and time t is defined by a timestamp provided by the control module 20. In one example, the control module 20 collects and stores datasets X1,t1 and X2,t2 during the pre-synchronization phase of each synchronization event executed by the transmission 10. As described in additional detail herein, the control module 20 is operable to determine the pre-synchronization velocity $V_{PS}$ of the fork 14 as the fork moves from X1 to X2 for each synchronization event, using the datasets X1,t1 and X2,t2 collected for that respective synchronization event, to enable the control module 20 to compare the pre-synchronization velocity $V_{PS}$ for each synchronization event to a velocity target $V_T$, and to adjust the initial applied pressure level P1 to adjust the pre-synchronization velocity $V_{PS}$ when a difference between the pre-synchronization velocity $V_{PS}$ and the velocity target $V_T$ is detected. In one example, at least one look-up table is stored in memory (M) and accessible by the control module 20 to determine the adjustment to the initial applied pressure level P1 based on the difference between the pre-synchronization velocity $V_{PS}$ and the velocity target $V_T$. As such, a method of controlling a transmission 10, such as the method shown in FIG. 4, may be embodied as a program and/or one or more algorithms operable on and/or executable by the control module 20. It should be appreciated that the control module 20 may include any device capable of analyzing data from various data sources in communication with the control module 20 including, but not limited to, the fork position sensor 22, comparing data, making the necessary decisions required to control the operation of the transmission 10, and executing the required tasks necessary to control the operation of the transmission 10.

Figure 2:
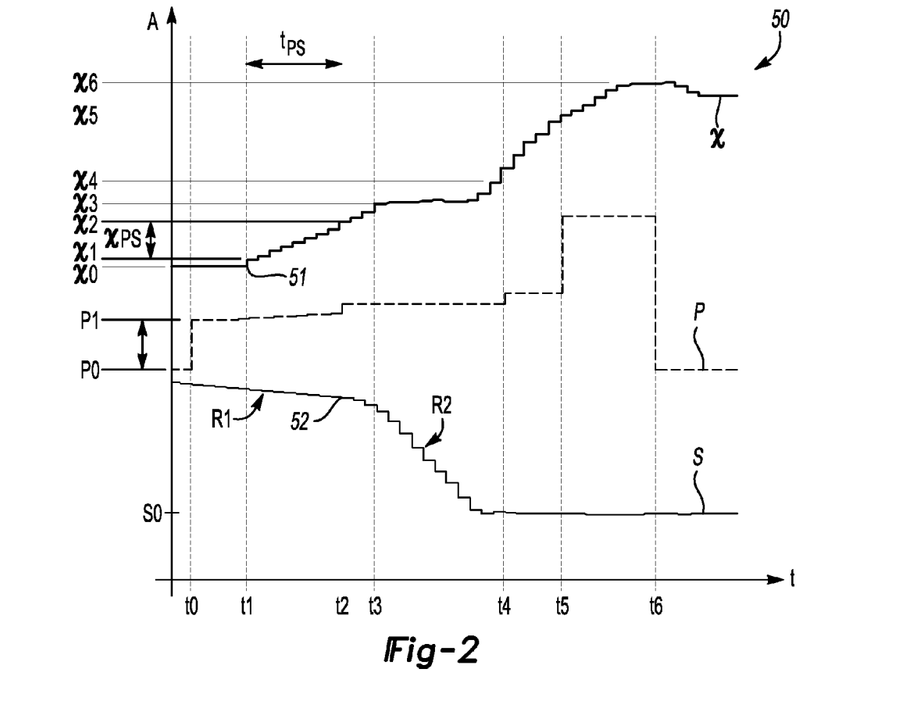
FIG. 2 is a graph relating a position of the actuator fork, an applied actuator fluid pressure, and synchronizer slip to time during a synchronization event including a pre-synchronization phase and a synchronization phase.

The movement of each of the actuator forks 14 is controlled by a pressure solenoid 32, which applies fluid pressure at a pressure level P to a first side 28 of the actuator piston 26 to move the actuator piston 26 in an engagement direction 36, in the example shown, and a flow solenoid 34 disposed in series with the pressure solenoid 32, which controls fluid flow from a second side 30 of the actuator piston 26. The fork velocity $V_F$ at which the actuator piston 26 and the fork 14 attached thereto is moved is proportional to the level of the fluid pressure P applied to the actuator piston 26. As the applied fluid pressure P increases, the velocity $V_F$ of the fork 14 and the sleeve 16 attached thereto increases, as does the force output by the sleeve 16 in contact with other components of the system, including the strut assembly 54 disposed between the sleeve 16 and the hub 48 as shown in FIG. 3. Likewise, as the pressure level of the applied fluid pressure P is decreased, the fork velocity $V_F$ of the fork 14 and the sleeve 16 attached thereto decreases, thereby increasing, for example, the amount of time required to execute the pre-synchronization phase of a synchronization event. The elapsed time to execute movement of the fork 14 from a first pre-synchronization fork position X1 to a second pre-synchronization fork position X2 during the pre-synchronization phase may be referred to herein as the pre-synchronization time $t_{PS}$. In the example shown in FIG. 2, the fork pre-synchronization velocity $V_{PS}$ of the fork 14 as it moves a pre-synchronization distance of $X_{PS}$, e.g., from a first pre-synchronization fork position X1 to a second pre-synchronization fork position X2, can be determined by the formula:

$$V_{PS}=X_{PS}/t_{PS}=(X2-X1)/(t2-t1) \qquad (1)$$

where the pre-synchronization fork velocity $V_{PS}$ is directly controlled by, e.g., corresponds to, the initial applied pressure level P1 of the fluid pressure applied to the actuator piston 26 at time t0 to initiate movement of the actuator piston 26 and the fork 14 in the engagement direction 36 from the neutral position X0 toward the first pre-synchronization fork position X1 the during the pre-synchronization phase of the synchronization event.

Figure 4:
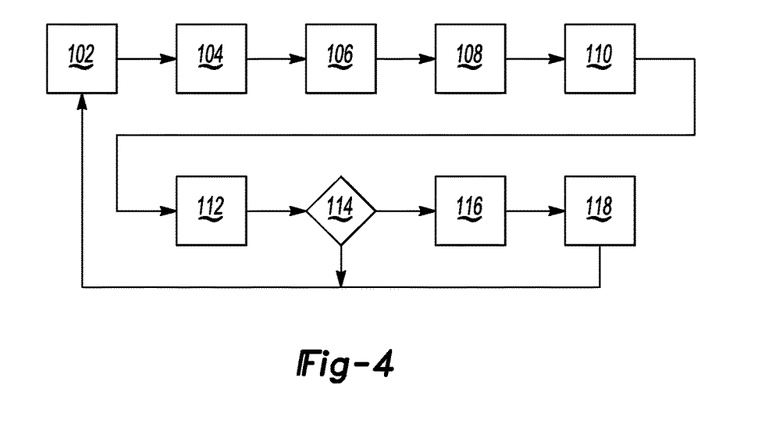
FIG. 4 is a flowchart illustrating a method for controlling the velocity of the actuator fork during the pre-synchronization phase.

In order to get fast responding, smooth operation from the transmission 10 during a synchronization event, the movement of each synchronizer 12 of the transmission 10 during the pre-synchronization phase must be consistent and predictable. Accordingly, a method of controlling the transmission 10 is described herein and is illustrated by FIGS. 2 and 4. The method includes commands executable by the control module 20 to control the fork pre-synchronization velocity $V_{PS}$ within a predetermined velocity range defined by a velocity target $V_T$, to provide consistent and predictable movement of the synchronizer 12 during the pre-synchronization phase to ensure quick, smooth shifts and to ensure the strut 56 is retained to the sleeve 16 during the pre-synchronization phase such that the retained strut 56 can exert an axial force 94 on the blocker ring 66 to engage the blocker ring 66 to the gear 40. The method of FIG. 4 determines the actual pre-synchronization velocity $V_{PS}$ of the fork 14 during the pre-synchronization phase of a synchronization event by measuring the elapsed pre-synchronization time $t_{PS}$ required to move the fork 14 the pre-synchronization distance $X_{PS}$, compares the actual (measured) fork pre-synchronization velocity $V_{PS}$ to a velocity target $V_T$, and adapts, e.g., adjusts, the pressure signal sent to the actuator piston 26 at t0 to apply an initial pressure P1 to the actuator piston 26 to control the pre-synchronization velocity $V_{PS}$ of the actuator fork 14 within a velocity range defined by the velocity target $V_T$. The velocity target $V_T$ may be determined for the transmission 10, for example, by calibration, and may be determined for each of a plurality of shift types executable by the transmission 10. The velocity range is defined by a lower velocity limit $V_L$ and an upper velocity limit $V_U$, where $V_L<V_T<V_U$. The upper velocity limit $V_U$ is less than the breakaway velocity $V_{BA}$, such that $V_U<V_{BA}$. The lower velocity limit $V_L$ may be determined, for example, by calibration, based on shift responsiveness and/or shift feel during a synchronization event. While the method shown in FIG. 4 and described herein is described in relation to the transmission 10 shown in FIG. 1, which may be one of an automated manual transmission 10 and a dual clutch transmission 10, it should be appreciated that the method may be applied to other types of transmissions 10 not shown or described herein.

The method includes providing a control module 20 operable to control the transmission 10. As noted above, the control module 20 includes all processors (P), software, hardware, memory (M), algorithms (50), connections, sensors 22, etc. necessary to manage and control the operation of the transmission 10. The control module 20 is operable to perform the various tasks of the method described below, including controlling the initial pressure level P1 applied to the actuator piston 26 to control the pre-synchronization fork velocity $V_{PS}$ of the actuator fork 14 and attached sleeve 16 at the initiation of a synchronization event. In the method provided herein, the controller 20 is operable to control the movement and fork velocity $V_F$ of the fork 14 to move the fork 14 at a pre-synchronization velocity $V_{PS}$ from a first pre-synchronization fork position X1 to a second pre-synchronization fork position X2, and to control the pre-synchronization fork velocity $V_{PS}$ to be within a predetermined velocity range defined by a velocity target $V_T$ by adjusting the initial applied pressure level P1. The controller 20 is operable to control the fork velocity $V_F$ during the synchronization phase at a synchronization velocity $V_S$, which may be the same as or different from the pre-synchronization velocity $V_{PS}$.

In one example, the controller 20 is operable to determine the type of shift being requested and to command the transmission 10 to execute the requested shift type. The shift type may also be referred to herein as the shift mode. For example, the controller 20 may be operable to execute a plurality of different shift types, including at least one fast shift type and at least one slow shift type. Slow shift types, which may also be referred to as a normal or quiet shifts, may include shift modes or types such as normal upshifts, rolling neutral shifts, and/or coast down shifts. Fast shift types may include, for example, step-down and/or power-down shifts where a faster fork engagement, relative to a slow shift, may be desirable. The pre-synchronization velocity target $V_T$ for each shift type may be different. For example, the controller 20 may have stored in memory (M) a first pre-synchronization velocity target $V_{TA}$ for a first shift type, and a second pre-synchronization velocity target $V_{TB}$ for a second shift type, where both of the pre-synchronization target velocities $V_{TA}$, $V_{TB}$ are less than the breakaway velocity $V_{BA}$. By way of example, the first shift type A may be a slow shift mode and the second shift type B may be a fast shift mode, such that $V_{TA}<V_{TB}<V_{BA}$. As described previously, the pre-synchronization fork velocity $V_{PS}$ is directly controlled by, e.g., corresponds to, the initial applied pressure level P1 of the fluid pressure applied to the actuator piston 26. As such, the controller 20, in response to receiving a shift request for a first type shift, will command an initial applied pressure level P1A to provide a pre-synchronization fork velocity $V_{PSA}$ during execution of the first type shift. Likewise, the controller 20, in response to receiving a shift request for a second type shift, will command an initial applied pressure level P1B to provide a pre-synchronization fork velocity $V_{PSB}$ during execution of the second type shift, where the P1A and P1B are different applied pressure levels. In the present example of a first shift type A which is a slow shift, and a second shift type B, the respective applied pressure levels are related such that P1A<P1B.

Referring to the graph 50 shown in FIG. 2, time t is shown on the horizontal axis. The graph 50 shows the axial position X of the actuator fork 14, the applied pressure level P of the fluid applied to the actuator piston 26, and the synchronizer slip S during a synchronization event initiated at time t0 and completed at time t6, where the amplitude A of each of the fork position C, applied pressure level P and synchronizer slip S is shown on the vertical axis. Change in the time t along the horizontal axis represents the elapsed time during the synchronization event. The position X of the actuator fork 14 is determined relative to a position datum 60, which in FIGS. 3 and 5-6 is shown as a plane bisecting the ball plunger 62 when the ball plunger 62 is fully retained in and aligned to the detent 46 of the sleeve 16 and the transverse centerline of the sleeve 16 is aligned to the transverse centerline of the hub 48, as shown in FIG. 3, such that the strut assembly 54 is in a neutral position X0 relative to the hub 48, e.g., not displaced from the hub 48 by the sleeve 16 in either of the engagement or disengagement directions 36, 38. The position X of the actuator fork 14 is determined relative to the tips 80 of the sleeve teeth 76 at the engaging side of the sleeve 16, e.g., at the sleeve face 74 (see FIG. 3) which first engages with the blocker ring 66 and/or gear 40 to be coupled with the hub 48 during a synchronization event, and as shown in FIGS. 3 and 5-6, when the sleeve 16 is being moved axially in the engagement direction 36. Change in the position X along the vertical axis represents movement of the fork 14 and attached sleeve 16 relative to the datum 60 during a synchronization event.

The applied pressure level P of the fluid applied to the actuator piston 26 is shown in graph 50, where the applied pressure level is increased from an ambient pressure level P0 to an initial applied pressure level P1 by a command executed by the controller 20, to initiate movement of the fork 14 in the engagement direction 36 at the initiation of the pre-synchronization phase of a pre-synchronization event, for example, from the neutral fork position X0 to the first fork position X1. The controller 20 is operable to command additional increases in the applied pressure level P as required to complete the synchronization event, where by example, the applied pressure level P is increased at times t2, t4 and t5 during the synchronization event. Synchronizer slip S is shown on graph 50, where the synchronizer slip S is a function of the measured output speed of the transmission 10, the measured speed of the shaft 42 that the synchronizer 12 rotates on, and the gear ratio between the two. The synchronizer slip S is characterized by a first ramp rate R1 during the pre-synchronization phase and a second ramp rate R2 during the synchronization phase of the synchronization event, where the slip is reduced to zero at the completion of the synchronization event.

The controller 20 is operable to measure and determine the elapsed time $t_{PS}$ to move the actuator fork 14 from the first position X1 to the second position X2 during the pre-synchronization phase, for example, by using the position sensor 22 (see FIG. 1) to sense the fork 14 at the first fork position X1, at which time t1 the position sensor 22 outputs a first position signal to the controller 20, and to sense the fork 14 at the second fork position X2, at which time t2 the position sensor 22 outputs a second position signal to the controller 20. The controller 20 is operable to determine the elapsed time $t_{PS}$ using the first and second position signals received from the position sensor 22 to determined the elapsed time $t_{PS}$, where the elapsed time $t_{PS}$ can be determined by the formula:

$$t_{PS} = t2 - t1 \quad (2)$$

The controller 20 may be operable to time stamp one or more data points and/or signals received by the controller 20, and to store the time stamp with the data point in the memory (M), such that the time stamp can be used to determine a time associated with the data point. In one example, the controller 20 is operable to time stamp the first position signal with a first time stamp, such that the first time stamp can be used to determine the time t1 the fork 14 is positioned at the first fork position X1 during the pre-synchronization phase of a synchronization event. Likewise, the controller 20 is operable to time stamp the second position signal with a second time stamp, such that the second time stamp can be used to determine the time t2 the fork 14 is positioned at the second fork position X2 during the pre-synchronization phase of the synchronization event.

The position sensor 22 may include a plurality of sensors to detect the position X of the fork 14. For example, a first sensor may be used to detect the fork 14 positioned at fork position X1, and a second sensor may be used to detect the fork position 14 at fork position X2. In one example, the sensor 22 is configured to detect the movement of the fork 14 relative to the neutral position X0. In another example, the position of the fork 14 may be determined by the condition of one or more other components and/or operating characteristics of the synchronizer 12 and/or the transmission 10. For example, the controller 20 may determine the fork 14 is at the first fork position X1 by sensing initial contact of the strut 56 with the blocker ring 66 at the blocker ring interface 68, where the strut 56 is moved in contact with the blocker ring interface 68 by movement of the sleeve 16 by the fork 14 in the engagement direction. In another example, the controller 20 may monitor the synchronizer slip S (see FIG. 2) to detect the time where the rate of slip S changes from a first slip rate R1 to a second slip rate R2, shown on graph 50 as point 52, where the controller 20 may time stamp this data point, e.g., the point at which the rate of slip S changes from the first slip rate R1 to the second slip rate R2, to determine t2 and/or X2.

The method disclosed herein includes determining the pre-synchronization fork velocity $V_{PS}$ as the fork 14 and attached sleeve 16 move axially during the pre-synchronization phase of a synchronization event, using the controller 20 and the position sensor 22 shown in FIG. 1 to calculate the pre-synchronization fork velocity $V_{PS}$, where the controller 20 is configured to measure the time t1 by recording a timestamp corresponding to the position X1 sensed by the position sensor 22 and to measure the time t2 by recording a timestamp corresponding to the position X2 sensed by the position sensor 22. In one example, the controller is configured to record a respective data set consisting of X1, t1 and X2, t2 for each respective synchronization event executed by the transmission 10, and to record the data sets to the memory (M), such that the pre-synchronization velocity $V_{PS}$ determined for a respective synchronization event can be compared to the pre-synchronization velocity $V_{PS}$ of the at least one other synchronization event to determine a change in the pre-synchronization velocity $V_{PS}$ of the compared events. The controller 20 may be operable, for example, to determine an average pre-synchronization velocity $V_{PS}$(average) over a predetermined number of synchronization events, and to compare the pre-synchronization fork velocity $V_{PS}$ of a current synchronization event to the average velocity $V_{PS}$(average). The controller may be operable, for example, to monitor the pre-synchronization velocity $V_{PS}$ of a sequence of synchronization events to determine trends or changes in the pre-synchronization velocity $V_{PS}$ over time, where a trend may be indicative of a condition change in the components of the synchronizer 10 and/or actuator 24, such as a wear condition, or a condition change in the fluid being applied to the actuator piston 26.

The controller 20 is in communication with the position sensor 22 and the actuator 24 such that the controller 20 may command the actuator 24 to adjust the fluid pressure P applied to the first side 28 of the actuator piston 26 in response to a difference between the pre-synchronization velocity $V_{PS}$ and the velocity target $V_T$, to adjust the pre-synchronization velocity $V_{PS}$ of the fork 14 for the next subsequent synchronization event, to the pre-determined pre-synchronization velocity target $V_T$ and/or within the velocity target range defined by the velocity target $V_T$ where the velocity target range is defined by a lower velocity limit $V_L$ and an upper velocity limit $V_U$, where $V_L < V_T < V_U$, and $V_U < V_{BA}$, as previously described herein. In one example, controller 20 is configured to adjust the initial applied pressure level P1 to adjust the pre-synchronization velocity $V_{PS}$ of the fork 14 only when the measured pre-synchronization velocity $V_{PS}$ is outside of the velocity target range, such that adjustments to the initial applied pressure level P1 are not continuously made to adjust the pre-synchronization velocity VPS to equal the target velocity, but at a frequency to maintain the pre-synchronization velocity $V_{PS}$ within the velocity target range for the pre-synchronization phase of each synchronization event executed by the synchronizer 12, e.g., between the target velocity upper and lower limits such that $V_L<V_{PS}<V_U$, to provide a consistent feed and shift speed over the operating life of the transmission 10.

Referring to FIGS. 2 and 3, FIG. 3 shows the synchronizer 10 in the neutral position, with the fork 14 at position X0, at time t0 of the synchronization event illustrated by the graph 50 of FIG. 2. The points 51 and 52 identified in the graph 50, respectively, at times t1 and t2 correspond, respectively, to the synchronization conditions depicted in FIGS. 5 and 6. The synchronization condition shown in FIG. 5 corresponds with the reference point 51 on the graph 50 to indicate that at position X1 and time t1 the components of the transmission 10 are positioned relative to each other as shown in FIG. 5, where at time t1, the fork 14 is in the first pre-synchronization position X1 with the strut interface 64 of the strut 56 in initial contact with the blocker ring interface 68 of the blocker ring 66. The synchronization condition shown in FIG. 6 corresponds with the reference point 52 on the graph 50 to indicate that at position X2 and time t2 the components of the transmission 10 are positioned relative to each other as shown in FIG. 6, where at time t2, the fork 14 is in the second pre-synchronization position X2 with the strut 56 in contact with and exerting a sleeve force 90 on the blocker ring 66 in the direction 94.

Referring to FIG. 2 in conjunction with FIGS. 3, 5 and 6, the pre-synchronization phase of the synchronization event depicted by graph 50 includes the controller 20 commanding an increase in the fluid pressure level applied to the actuator piston 26 from an ambient level P0 to an initial applied fluid pressure level P1 to actuate the actuator 24 to move the fork 14 and attached sleeve 16 beginning at time t0 from the neutral position X0 shown in FIG. 3 toward the first fork position X1. At the neutral fork position X0, the ball plunger 62 is engaged in the detent 46 and exerts a plunger force 98 to retain the ball plunger 62 in the detent 46 such that the strut assembly 54, including the strut 56, moves with the sleeve 16 in the engagement direction 36 when the fork 14 with the sleeve 16 attached is moved by the actuator 24 in response to the initial applied fluid pressure P1, and at a fork velocity $V_F$ less than the breakaway force $V_{BA}$. At time t1, the fork 14 and attached sleeve 16 have moved to and are positioned at the first pre-synchronization fork position X1 such that the strut interface 64 of the strut 56 retained via the ball plunger 62 to the sleeve 16 is moved in contact with a blocker ring interface 68 of the blocker ring 66, as shown in FIG. 5. The actuator 24 continues to move the fork 14 from the first fork position X1 to the second pre-synchronization position X2 at the pre-synchronization fork velocity $V_{PS}$ defined by the applied pressure level P1. At time t2, the fork 14 has moved to and is positioned at the second fork position X2 as shown in FIG. 6. At the second pre-synchronization position X2 the fork 14, via the strut 56 retained to the sleeve 16 via the ball plunger 62, exerts an axial force 94 on the blocker ring interface 68, as shown in FIG. 6, to move a blocker ring face 70 (see FIG. 3) of the blocker ring 66 in frictional contact with a gear face 72 (see FIG. 3) of the gear 40, where at the point of contact the blocker ring 66, the hub 48 and sleeve 16 are rotating at a first rotational speed, and the gear 40 is rotating at a second rotational speed, and the rate of synchronizer slip S increases from the first slip rate R1 to the second slip rate R2. From time period t3 to t4, the axial force 94 exerted on the blocker ring interface 68 by the strut 56 is maintained such that frictional contact is maintained between the blocker ring face 70 and the gear face 72 to equalize the rotational speed of the blocker and the rotational speed of the gear 40, such that at time t4 the gear 40, blocker ring 66, sleeve 16 and hub 48 are rotating at the same rotational speed and the slip S is decreased to S0, e.g., to zero. Referring again to FIG. 2, at time t4 the rotational speed of the blocker ring 66, hub 48, sleeve 16 and gear 40 are equalized and the fork 14 continues to move in the engagement direction 36 in blocking travel from time t4 and position X4 to complete the synchronization event.

FIG. 4 illustrates a method for controlling, via the controller 20 in communication with the actuator 24, the pre-synchronization fork velocity $V_{PS}$ at a pre-determined velocity, where in the illustrative example the pre-determined velocity is a velocity range defined by a velocity target $V_T$. As described previously herein, the velocity range is bounded by a lower velocity limit $V_L$ and an upper velocity limit $V_U$, where $V_L<V_T<V_U<V_{BA}$, where $V_{BA}$ is the breakaway velocity such that the breakaway velocity $V_{BA}$ may define the velocity upper limit $V_U$. The velocity target $V_T$ may be determined for a specific shift type, such as a fast shift or slow shift, and may be determined by calibration and/or to provide a shift response time for the specific shift type. The velocity lower limit $V_L$ may be defined by calibration, for example, to provide a minimum shift response time during a synchronization event.

At step 102 of the method shown in FIG. 4, the controller 20 receives a shift request to command execution of a shift by the transmission 10, where the requested shift includes a synchronization event. At step 104, at time t0, the controller 20 commands application of an initial applied pressure level P1 to the actuator piston 24, as described previously herein, to initiate the pre-synchronization phase of the synchronization event by actuating movement of the fork 14 in the engagement direction 36, where the movement of the fork 14 occurs at a pre-synchronization velocity $V_{PS}$ determined by the initial applied pressure level P1.

At step 106, the controller 20 determines the time t1 at which the fork 14 is detected at the first pre-synchronization position X1. The controller 20 may determine the time t1, by way of non-limiting example, based on a first signal output from the fork position sensor 22 when the sensor 22 detects the fork 14 at the first fork position X1. In another example, the controller 20 may detect the initial contact of the strut 56 with the blocker ring 66 as a means of determining the time t1. The controller 20 may record the time t1 to a memory (M), and/or the controller 20 may time stamp the first signal output from the fork position sensor 22 with a first time stamp and record the first time stamp to a memory (M).

At step 108, the controller 20 determines the time t2 at which the fork 14 is detected at the second pre-synchronization position X2. The controller 20 may determine the time t2, by way of non-limiting example, based on a second signal output from the fork position sensor 22 when the sensor 22 detects the fork 14 at the second fork position X2. In another example, the controller 20 may detect a change in the slip rate from a first slip rate R1 to a second slip rate R2 as a means of determining the time t2. The controller 20 may record the time t2 to a memory (M), and/or the controller 20 may time stamp the second signal output from the fork position sensor 22 with a second time stamp and record the second time stamp to a memory (M).

Execution of the synchronization event continues as illustrated by graph 50, to complete the synchronization event and the requested shift. Concurrent with the completion of the synchronization event, the controller 20 at step 110, determines the pre-synchronization velocity $V_{PS}$ of the fork 14 during movement of the fork 14 from the first fork position X1 to the second fork position X2 during the pre-synchronization phase of the synchronization event being executed. The pre-synchronization velocity $V_{PS}$ can be determined, as previously described, using the formula:

$$V_{PS} = X_{PS}/t_{PS} = (X2-X1)/(t2-t1) \quad (1)$$

At step 112 of the method shown in FIG. 4, the controller 20 identifies a pre-synchronization velocity target $V_T$ and a velocity range defined by the velocity target and bounded by a lower velocity limit $V_L$ and an upper velocity limit $V_U$. At step 114, the controller 20 compares the pre-synchronization velocity $V_{PS}$ determined for the current synchronization event to the lower and upper velocity limits $V_L$, $V_U$. When the pre-synchronization velocity $V_{PS}$ is within the lower and upper velocity limits $V_L$, $V_U$, e.g., when $V_L < V_{PS} < V_U$, the current value of the initial applied pressure level P1 is maintained, and the method returns to step 102, such that the method is repeated beginning at step 102 for the next synchronization event, e.g., when the controller 20 receives a subsequent or next shift request.

When, at step 114, the pre-synchronization velocity $V_{PS}$ is outside the lower and upper velocity limits $V_L$, $V_U$, e.g., when $V_{PS} < V_L$ or $V_{PS} > V_U$, the method proceeds to step 116. At step 116, controller 20 determines the difference between the pre-synchronization velocity $V_{PS}$ and the velocity target $V_T$, and determines the amount by which the initial applied pressure level P1 should be adjusted. The magnitude and direction of the adjustment corresponds to the magnitude and direction of the difference between pre-synchronization velocity $V_{PS}$ and the velocity target $V_T$. For example, when $V_{PS} < V_L$, the controller 20 adjusts the value of the initial applied pressure level P1 upward to an adjusted value P1', e.g., increases the value of P1 in proportion to the difference $V_T - V_{PS}$, such that during the next synchronization event, the actuator piston 24 is actuated by the increased applied pressure level P1' to move at an adjusted pre-synchronization velocity $V_{PS}'$, where $V_{PS}'$ has been adjusted within the velocity range such that $V_L < V_{PS}' < V_U$. For example, when $V_{PS} > V_U$, the controller 20 adjusts the value of the initial applied pressure level P1 downward to an adjusted value P1', e.g., decreases the value of P1 in proportion to the difference $V_{PS} - V_T$, such that during the next synchronization event, the actuator piston 24 is actuated by the decreased applied pressure level P1' to move at an adjusted pre-synchronization velocity $V_{PS}'$, where $V_{PS}'$ has been adjusted within the velocity range such that $V_L < V_{PS}' < V_U$. As described previously, one or more look-up tables may be stored in memory (M) and accessed by the controller 20 during this step, to determine the amount by which the initial applied pressure level P1 should be adjusted.

At step 118, the controller adjusts the value of the initial applied pressure level P1 to the adjusted initial applied pressure level P1', and the method returns to step 102, where during execution of a subsequent synchronization event, the controller 20 commands application of the applied fluid pressure at the adjusted initial pressure level P1', which is then evaluated using steps 104 through 118, such that the method shown in FIG. 4 is looped continuously with each synchronization event executed by the transmission 10 and controller 20.

In one example, the method shown in FIG. 4 further includes the controller 20 determining a shift type of the shift request received at step 102. In an illustrative example, the shift type is one of a first shift type A and a second shift type B, such that, beginning at step 102, the controller 20 determines if the requested shift is a type A shift or a type B shift. The illustrative example is non-limiting, and it is understood that the transmission 10 may be operable to execute a plurality of shift types including, but not limited to, the first and second shift types A and B.

In the present example, step 104 as previously described, further includes the controller 20 selecting an initial applied pressure level P1 defined by the shift type being executed by the transmission 10, to be applied to the actuator piston 24 to initiate the pre-synchronization phase. For example, when controller 20 at step 102 identifies the shift type being executed as a first shift type A, the controller 20 at step 104 selects a corresponding initial applied fluid pressure level P1A to be applied to the actuator piston 24 at time t0. Similarly, when controller 20 at step 102 identifies the shift type being executed as a second shift type B, the controller 20 at step 104 selects a corresponding initial applied fluid pressure level P1B to be applied to the actuator piston 24 at time t0. In the example where the first shift type A is a slow shift type and the second shift type B is a fast shift type, the applied fluid pressure level P1B is greater than the applied fluid pressure level P1A, such that the pre-synchronization fork velocity $V_{PSB}$ for the fast shift type B is higher than the pre-synchronization fork velocity $V_{PSA}$ for the slow shift type A.

In the present example, step 112 as previously described, further includes the controller 20 identifying a pre-synchronization velocity target $V_T$ and a velocity range defined by the velocity target $V_T$, where the velocity target $V_T$ is defined by the shift type being executed by the transmission 10. For example, when the controller 20 at step 102 identifies the shift type being executed as a first shift type A, the controller 20 at step 112 selects a corresponding pre-synchronization velocity target $V_{TA}$. Similarly, when the controller 20 at step 102 identifies the shift type being executed as a second shift type B, the controller 20 at step 112 selects a corresponding pre-synchronization velocity target $V_{TB}$. In the example where the first shift type A is a slow shift type and the second shift type B is a fast shift type, the pre-synchronization velocity target $V_{TB}$ is greater than the pre-synchronization velocity target $V_{TA}$. In the present example, at step 114 the controller 20 compares the pre-synchronization velocity $V_{PS}$ determined for the current synchronization event to the lower and upper velocity limits $V_L$, $V_U$ of the velocity range corresponding to the one of the velocity targets $V_{TA}$, $V_{TB}$ defined by the shift type of the current synchronization event, and step 114 proceeds as previously described, using the selected one of the velocity targets $V_{TA}$, $V_{TB}$ as the velocity target $V_T$ to complete step 114 and the subsequent steps of the method shown in FIG. 4.

The method described herein is advantaged by controlling the pre-synchronization fork velocity $V_{PS}$ within the predetermined range $V_L$, $V_U$ of the velocity target $V_T$, to provide consistent and predictable shift performance during the pre-synchronization phase of the synchronization event, where the velocity target $V_T$ can be adapted for each shift type executable by the transmission 10. Controlling the pre-synchronization velocity $V_{PS}$ by adjusting the applied fluid pressure level P is advantaged by providing the ability to utilize adjustments in the applied fluid pressure level P to compensate for variation in operating and environmental factors, including, for example, the ambient and operating temperatures of the transmission 10, variability in component dimensions, including variability over time due to wear, variability in fluid viscosity, temperature, etc. over the operating life of the transmission 10.

The detailed description and the drawings or figures are supportive and descriptive of the disclosure, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method of controlling a transmission including a shaft, the shaft having a synchronizer and a gear mounted thereon, the method comprising:
   moving, at a pre-synchronization fork velocity, an actuator fork of the synchronizer in a gear engagement direction, through a pre-synchronization phase of a synchronization event;
   wherein:
      the synchronization event includes the pre-synchronization phase and a synchronization phase;
      movement of the actuator fork is controlled by an actuator including an actuator piston;
      the actuator is operatively connected to the actuator fork and actuable to move the actuator fork in the gear engagement direction by applying a fluid pressure to the actuator piston at an applied fluid pressure level;
      the applied fluid pressure is commanded by a controller in communication with the actuator; and
      the pre-synchronization fork velocity is defined by the applied fluid pressure level;
   determining, via the controller, the pre-synchronization fork velocity;
   comparing, via the controller, the pre-synchronization fork velocity to a fork velocity target; and
   adjusting, via the controller, the applied fluid pressure level when the pre-synchronization fork velocity and the velocity target are not equal.

2. The method of claim 1, further comprising:
   comparing, via the controller, the pre-synchronization fork velocity to a predetermined range defined by the velocity target;
   maintaining the applied fluid pressure level when the pre-synchronization fork velocity is within the predetermined range; and
   adjusting the applied fluid pressure level when the pre-synchronization fork velocity is outside of the predetermined range.

3. The method of claim 2, further comprising:
   adjusting the applied fluid pressure level by a predetermined amount when the pre-synchronization fork velocity is outside the predetermined range;
   wherein the predetermined amount is defined by the difference between the pre-synchronization fork velocity and the velocity target.

4. The method of claim 1, further comprising:
   selecting, via the controller, a look-up table;
   wherein the look-up table provides a predetermined amount to adjust the applied fluid pressure according to the difference between the pre-synchronization fork velocity and the velocity target; and
   determining the predetermined amount to adjust the applied fluid pressure from the look-up table.

5. The method of claim 1, further comprising:
   commanding, via the controller, a shift including the synchronization event;
   wherein:
      the commanded shift is characterized by a shift type;
      the shift type is one of a plurality of shift types executable by the transmission; and
      the velocity target is defined by the shift type.

6. The method of claim 5, further comprising:
   selecting, via the controller, a look-up table from a plurality of look-up tables, each corresponding to a respective one of the plurality of shift types;
   wherein the selected look-up table corresponds to the shift type of the commanded shift and provides a predetermined amount to adjust the applied fluid pressure according to the difference between the pre-synchronization fork velocity and the velocity; and
   determining the predetermined amount to adjust the applied fluid pressure from the selected look-up table.

7. The method of claim 1, wherein:
   moving the actuator fork through a pre-synchronization phase comprises moving the actuator fork in the gear engagement direction from a first fork position to a second fork position;
   the method further comprising:
      sensing, via the at least one fork position sensor in communication with the controller, the actuator fork at the first fork position at a first time;
      outputting a first signal to the controller at the first time;
      sensing, via at least one fork position sensor, the actuator fork at the second fork position; and
      outputting a second signal to the controller at the second time.

8. The method of claim 7, further comprising:
   determining the pre-synchronization fork velocity using the first and second fork positions and the first and second times.

9. The method of claim 7, further comprising:
   time stamping, via the controller, the first signal with a first time stamp;
   time stamping, via the controller, the second signal with a second time stamp; and
   determining the pre-synchronization fork velocity using the first and second fork positions and the first and second time stamps.

10. The method of claim 9, further comprising:
   storing the first and second timestamps to a memory in communication with the controller.

11. The method of claim 7, wherein:
   the actuator fork is operatively attached to a synchronizer sleeve; and
   the first position is defined by a neutral position of the actuator fork relative to the synchronizer sleeve.

12. The method of claim 7, further comprising:
   monitoring, via the controller, synchronizer slip of the synchronizer during the synchronization event;
   wherein during the pre-synchronization phase the synchronizer slip is characterized by a first rate of slip and a second rate of slip; and
   wherein the second fork position is defined by a change in the rate of synchronizer slip from the first rate to the second rate.

13. A method of controlling a transmission including a shaft, the shaft having a synchronizer and a gear mounted thereon, the method comprising:
   commanding, via a controller, application of a fluid pressure at an applied fluid pressure level to an actuator piston of an actuator;
   applying the fluid pressure to the actuator piston at the applied fluid pressure level to move an actuator fork operatively connected to the actuator in a gear engagement direction from a first pre-synchronization position to a second pre-synchronization position;
   wherein the actuator fork is moved from the first pre-synchronization position to the second pre-synchronization position at a pre-synchronization fork velocity defined by the applied fluid pressure level;

measuring an elapsed time to move the actuator fork from the first pre-synchronization position to the second pre-synchronization position;

determining the pre-synchronization fork velocity of the fork using the first and second pre-synchronization positions and the elapsed time;

comparing, via the controller, the pre-synchronization fork velocity to a fork velocity target; and adjusting, via the controller, the applied fluid pressure level when the pre-synchronization fork velocity and the velocity target are not equal.

14. The method of claim 1, further comprising:
comparing, via the controller, the pre-synchronization fork velocity to a predetermined range defined by the velocity target;
maintaining the applied fluid pressure level when the pre-synchronization fork velocity is within the predetermined range; and
adjusting the applied fluid pressure level by a predetermined amount when the pre-synchronization fork velocity is outside of the predetermined range;
wherein the predetermined amount is defined by the difference between the pre-synchronization fork velocity and the velocity target.

15. The method of claim 13, further comprising:
sensing, via at least one fork position sensor in communication with the controller, the actuator fork at the first fork position at a first time;
sensing, via at least one fork position sensor, the actuator fork at the second fork position; and
determining the elapsed time using the first and second times.

16. The method of claim 13, further comprising:
outputting, via at least one fork position sensor in communication with the controller, a first signal to the controller when the at least one fork position sensor senses the actuator fork at the first fork position;
time stamping, via the controller, the first signal with a first time stamp;
outputting, via the at least one fork position sensor in communication with the controller, a second signal to the controller when the at least one fork position sensor senses the actuator fork at the second fork position;
time stamping, via the controller, the second signal with a second time stamp; and
determining the pre-synchronization fork velocity using the first and second fork positions and the first and second time stamps.

17. The method of claim 13, further comprising:
commanding, via the controller, a shift including a synchronization event;
wherein:
the commanded shift is characterized by a shift type;
the shift type is one of a plurality of shift types executable by the transmission; and
the velocity target is defined by the shift type.

18. A system for controlling a transmission including a shaft, the shaft having a synchronizer and a gear mounted thereon, the system comprising:
a controller programmed to move an actuator fork of the synchronizer in a gear engagement direction through a pre-synchronization phase of a synchronization event at a pre-synchronization fork velocity;
an actuator piston operatively connected to the actuator fork and actuable by a fluid applied to the actuator piston at an applied fluid pressure level;
wherein:
the actuator piston is actuable to move the fork axially relative to an axis defined by the shaft;
during axial movement of the fork by the actuator piston, the pre-synchronization fork velocity is defined by the applied fluid pressure level; and
the controller is operable to adjust the applied fluid pressure level to control the pre-synchronization fork velocity of the actuator fork during the pre-synchronization phase within a predetermined range defined by a velocity target.

19. The system of claim 18, wherein the controller is operable to:
sense movement of the actuator fork from a first fork position to a second fork position during the pre-synchronization phase;
determine an elapsed time to move the actuator fork from the first position to the second position;
determine the pre-synchronization fork velocity using the first and second fork positions and the elapsed time; and
adjust the applied fluid pressure level when the pre-synchronization fork velocity is outside the predetermined range.

20. The system of claim 18, wherein the controller is operable to:
command a shift including the synchronization event;
wherein:
the commanded shift is characterized by a shift type;
the shift type is one of a plurality of shift types executable by the transmission; and
the velocity target is defined by the shift type.

* * * * *